April 8, 1924.

P. C. SCHERFF

HAT HOLDER

Filed Sept. 20, 1922

Inventor
P. C. Scherff
By
Attorney

April 8, 1924.
P. C. SCHERFF
HAT HOLDER
Filed Sept. 20, 1922
1,490,030
3 Sheets-Sheet 2
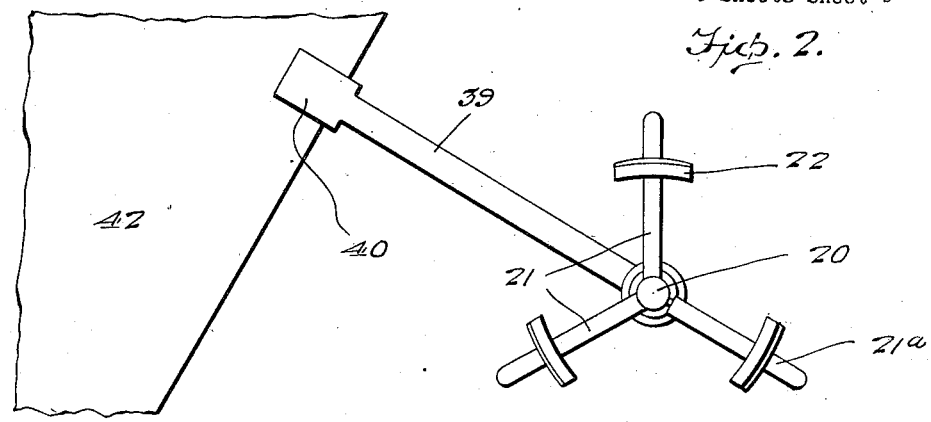
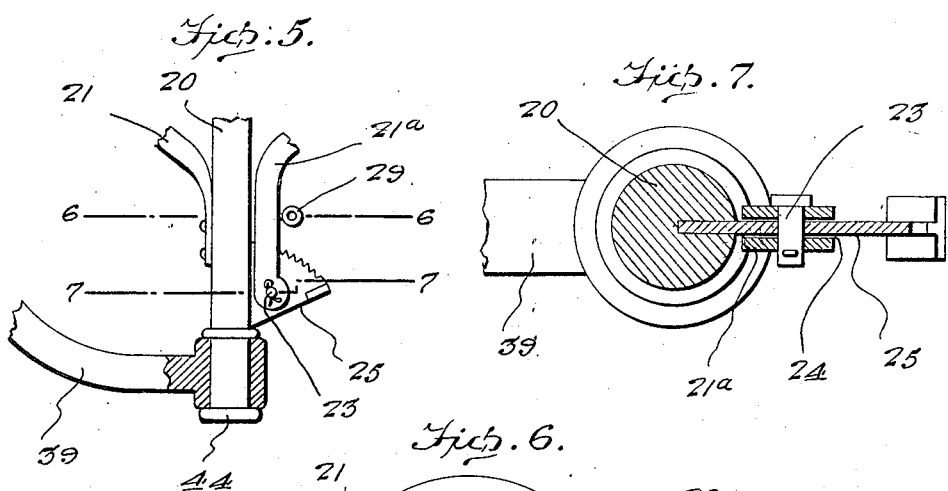
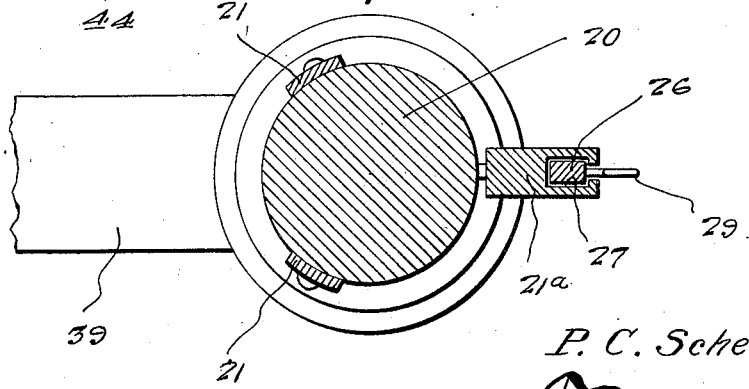
Inventor
P. C. Scherff
By
Attorney April 8, 1924.
P. C. SCHERFF
HAT HOLDER
Filed Sept. 20, 1922
1,490,030
3 Sheets-Sheet 3
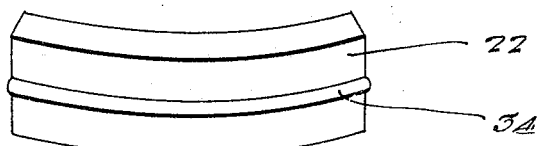
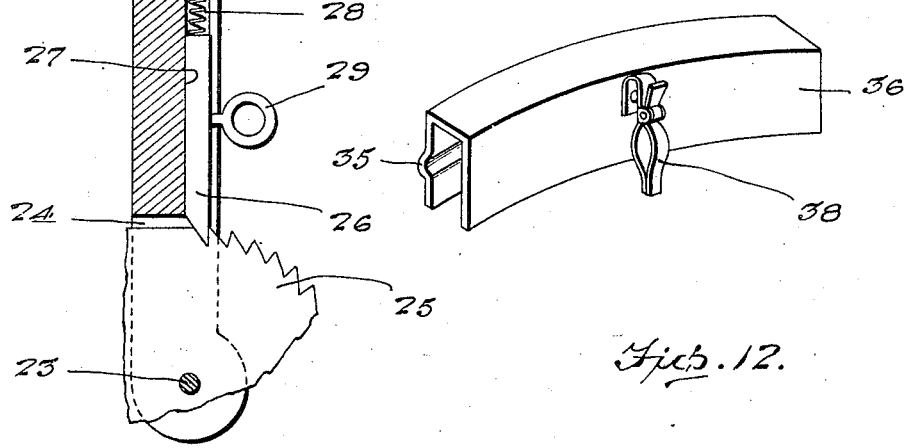
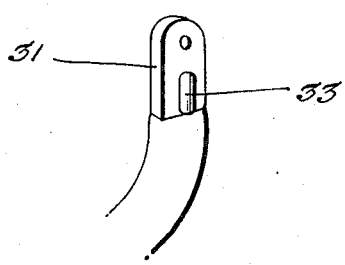
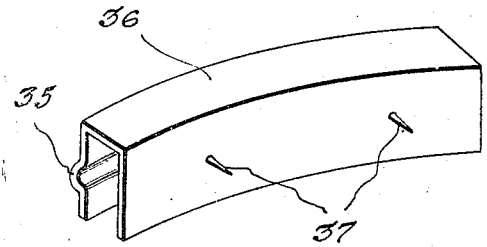
Inventor
P. C. Scherff
Attorney Patented Apr. 8, 1924.

1,490,030

UNITED STATES PATENT OFFICE.

PHILIPP C. SCHERFF, OF NEW YORK, N. Y.

HAT HOLDER.

Application filed September 20, 1922. Serial No. 589,431.

*To all whom it may concern:*

Be it known that I, PHILIPP C. SCHERFF, a citizen of the United States, residing at New York, in the county of New York and State of New York, have invented certain new and useful Improvements in a Hat Holder; and I do hereby declare the following to be a full, clear, and exact description of the invention, such as will enable others skilled in the art to which it appertains to make and use the same.

The object of the invention is to provide a simple and efficient device as a means of holding ladies' hats, in particular, during the lining and facing thereof and particularly after the hat has been exteriorly trimmed and may be provided with feathers, flowers, imitation fruit and like trimming devices, to minimize the amount of handling of the hat during the lining operation and avoid the risk of disturbing the exterior trimming or damaging the same in the course of adjusting and fastening the lining; and with this object in view the invention consists in a construction, combination and relation of parts of which a typical embodiment is illustrated in the accompanying drawing, wherein:

Figure 2 is a plan view of a hat holding apparatus constructed in accordance with the invention.

Figure 5 is a detail sectional view of the lower portion of the device showing the revoluble or swiveled stem, taken in the plane of the adjustable or movable arm, Figures 6 and 7 are detail transverse sectional views on the planes indicated by the lines 6—6 and 7—7 of Figure 5, Figure 8 is a detail view of the lower end of the adjustable or movable arm, Figures 9 and 10 are detail views of interchangeable pads for use on the jaws for engagement with different types of hats, Figure 11 is a detail view of one of the hat engaging jaws detached, Figure 12 is a similar view of the upper end of one of the jaw carrying arms.

Figure 1:
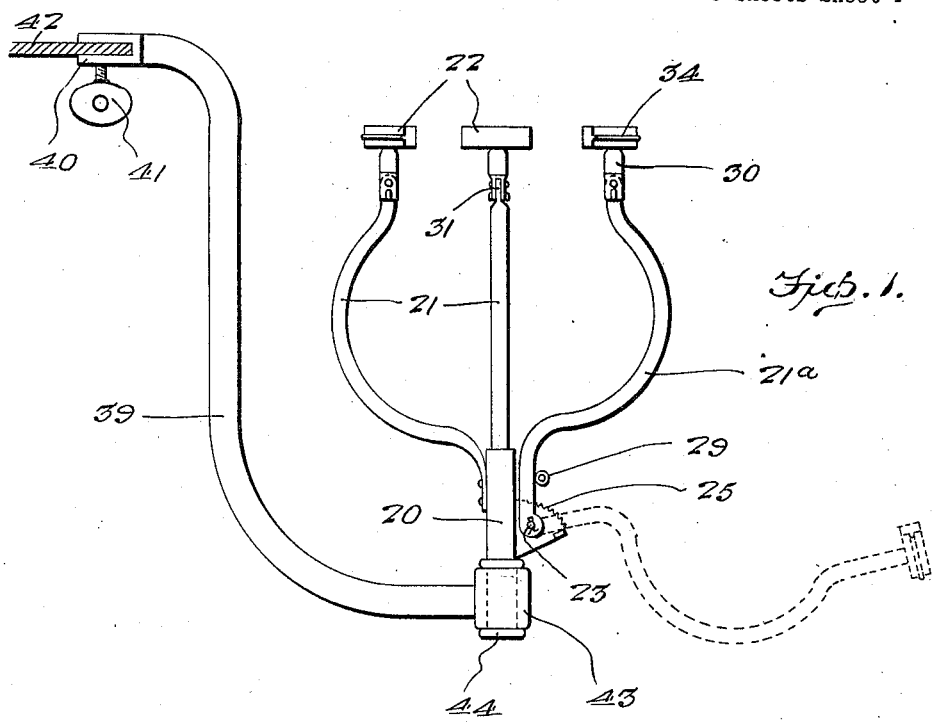
Figure 1 is a side view.

Mounted for rotary movement upon a suitable support is a stem or standard 20 carrying a plurality of arms 21 which are bowed outwardly between their extremities and are provided at their upper ends with hat engaging jaws 22, three of these arms being illustrated in the drawing with two of them designated as above indicated by 21 being rigidly attached to the stem or standard 20 and the third 21ª being pivotally mounted as at 23 upon the stem or standard for swinging movement to the dotted line position indicated in Figure 1 to effect expansion of the hat engaging elements to facilitate the placing of a hat in position for engagement by the jaws. The movable or pivotal arm 21ª is bifurcated at its lower end as indicated at 24 to straddle a ratchet segment 25 having teeth for engagement by a latch bolt 26 slidingly mounted in a guide groove 27 in the arm and propelled in a direction to engage the teeth of the ratchet by means of a spring 28. A ring forming a finger hold is arranged at 29 on the latch to facilitate the retraction thereof to release the arm and permit of its swinging movement to the inoperative position shown in dotted lines as above noted.

Figure 3:
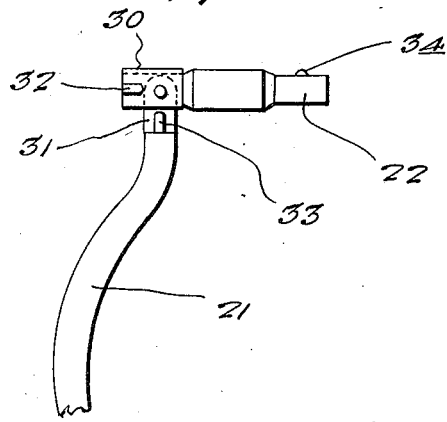
Figure 3 is a side view showing the jaws directed inwardly for supporting a hat by means of the brim, as when the sides of the crown are not available for engagement by the jaws.

The jaws 22 are of similar construction and each is provided with a stem 30 bifurcated to straddle the tongue 31 formed by the reduced upper end of the arm by which it is carried, the outer side of the bifurcation preferably being closed so that the stem can swing only inwardly with relation to the arm and the walls of the bifurcations being provided with interior grooves 32 for engagement with ribs 33 on the tongue 31 to provide an interlocking engagement to hold the jaws in their normal or upright position indicated in Figure 1. The jaw proper consists of a cross head carried by the stem and provided at its outer side with a longitudinal rib 34 for interlocking engagement with a groove 35 in the rear wall of a pad or cushion 36 which is removably fitted upon the jaw and is provided with means for engaging a hat which is to be held by the device. In Figure 9 there is shown a pad having fine spurs or points 37 for engaging the hat crown at the sides and in Figure 10 there is shown a modification of the hat engaging means consisting of a clamp 38. When the trimming of the hat is such as to prevent the jaws from engaging snugly with the angle between the hat crown and brim, it is preferable to turn the jaws inwardly as shown in Figure 3 to occupy a substantially horizontal position so that the brim of the hat may rest upon the jaws and thus support the hat in the proper inverted position to permit the operator to arrange and fasten the lining. The bowing or bulging of the jaw carrying arms serves to accommodate the trimming of the hat which may project to a greater or less extent beyond the contour of the crown and brim.

Figure 4:
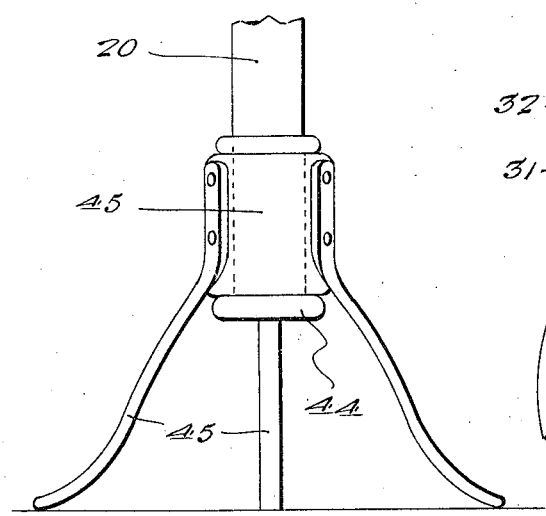
Figure 4 is a detail view of a modification of the supporting means for the holder.

In the construction illustrated in Figures 1 to 3 inclusive the support for the stem or standard 20 consists of a bracket arm 39 provided with a clamp 40 having a set screw 41 for engagement with a sewing table of which the edge is shown at 42, the free end of the bracket arm having a sleeve bearing 43 for the reception of the lower end of the stem or standard which is terminally headed as shown at 44 to prevent disengagement. In the modified construction shown in Figure 4 the stem or standard is mounted in a sleeve bearing 45 supported by legs 46 and thus constituting a base or pedestal which may rest upon the floor or a table or like horizontal supporting surface.

In the operation of the device, as will be obvious, the movable arm of the holder should be released to open the jaws for the reception of the hat which is to be trimmed and the latter in an inverted position may then be introduced between the jaws and the movable arm swung inwardly until the hat is firmly clamped and secured in position to give free access to the interior thereof for the adjustment of the lining, the trimmed crown of the hat being protected from injury by reason of being supported free from contact with any adjacent objects, such as the lap of the operator as in the ordinary process of trimming hats. As the work of placing the lining proceeds the hat can be turned to occupy any position desired by the operator without lifting it or disturbing its engagement by the holding jaws, by reason of the revoluble mounting of the stem or standard and owing to the minimizing of the handling which is secured under these conditions, the likelihood of injuring the previously applied trimming is eliminated and the operator is enabled to proceed very much more rapidly in the operation of lining than is possible under the conventional conditions where the greatest care must be exercised in lifting and turning the hat to avoid disturbing the trimming which has previously been arranged with care and with a view to producing a well defined artistic effect.

Having thus described the invention, what I claim is:—

1. A hat holder for the purpose indicated having in combination with a suitable support a swiveled standard provided with upwardly directed arms terminating in hat engaging jaws for supporting a hat in an inverted position during the application of the lining thereto, the jaws being pivotally mounted upon the arms for movement to occupy brim supporting positions.

2. A hat holder for the purpose indicated having in combination with a suitable support a swiveled standard provided with upwardly directed arms terminating in hat engaging jaws for supporting a hat in an inverted position during the application of the lining thereto, the jaws being pivotally mounted upon the arms for movement to occupy brim supporting positions, and interlocking means for securing said jaws in their adjusted positions.

In testimony whereof I affix my signature in presence of two witnesses.

PHILIPP C. SCHERFF.

Witnesses:
 SOL FULD,
 BERNARD ROSIN.